April 28, 1953     L. E. BUESS     2,636,996
CONTROL SYSTEM FOR DYNAMOELECTRIC MACHINES
Filed Feb. 13, 1952
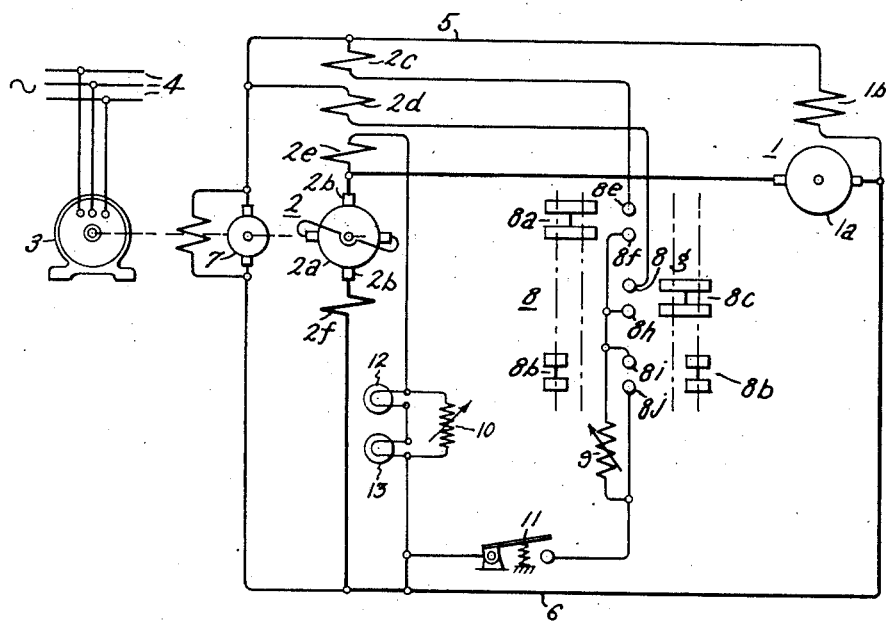
Inventor:
Laverne Edward Buess,
by *[signature]*
His Attorney.

Patented Apr. 28, 1953

2,636,996

UNITED STATES PATENT OFFICE 2,636,996

CONTROL SYSTEM FOR DYNAMOELECTRIC MACHINES

Laverne E. Buess, Tallmadge, Ohio, assignor to General Electric Company, a corporation of New York Application February 13, 1952, Serial No. 271,363

4 Claims. (Cl. 307—101)

This invention relates to control systems for dynamoelectric machines, and it has for an object the provision of an improved control system of this character.

In the normal operation of a number of industrial machines, of which a tire building machine is an example, as many as six thousand stops and starts are made in a single eight hour shift, and it is necessary to prevent creepage of the machine when stopped. To minimize the deceleration time and the wear on the machine it is desirable that the frequent stops be accomplished by regenerative braking of the drive motor. Regenerative braking may be produced by supplying the motor from an adjustable voltage generator and deenergizing the generator field winding to effect stopping. Unless the residual magnetism of the generator is neutralized, a small residual voltage will be generated which will cause the motor to creep. In the operation of machines of the character described, such creepage is intolerable.

Accordingly, a further object of the invention is the provision of a simple reliable, improved and inexpensive circuit for neutralizing the residual magnetism of a dynamoelectric machine.

A still further object of the invention is the provision of a neutralizing circuit which includes a field winding of the dynamoelectric machine of which the residual magnetism is to be neutralized.

A still further object of the invention is the provision of a neutralizing circuit which includes a field winding of the dynamoelectric machine but does not require any circuit making or breaking contacts associated with such field winding, thereby to reduce maintenance and wear to a minimum and to provide highly satisfactory performance on dynamoelectric machines used in equipments which are started and stopped many thousands of times in a single shift.

Still more specifically the invention relates to control systems for dynamoelectric machines having a main separately excited field winding and a self-excited field winding of opposite polarity, and a further object of the invention is the provision of means for causing the self-excited field winding to neutralize the residual magnetism of the machine following deenergization of the main field winding without using a contact making and breaking device associated with the self-excited field circuit.

In carrying the invention into effect in one form thereof, a switching device is provided for interrupting the main separately excited field winding of a dynamoelectric machine to effect demagnetization thereof, and means are provided for enabling the self-excited field winding of the machine to neutralize the residual magnetism of the machine following such interruption of the circuit of the main field winding which comprises a resistor connected in circuit with the self-excited field winding which has a relatively high resistance when operating at rated voltage and a relatively low resistance when operating at a relatively lower voltage. In a specific embodiment of the invention such resistor may take the form of an incandescent lamp the resistance of the filament of which when operating at rated voltage is at least several times its cold resistance.

For a better and more complete understanding of the invention, reference should now be had to the following specification, and to the accompanying drawing of which the single figure is a simple diagrammatical illustration of an embodiment of the invention.

Referring now to the drawing, a direct current motor 1 is connected to drive a load (not shown) which requires frequent starts, stops and jogs. For the purposes of illustration, the motor 1 may be assumed to be a 2 horsepower motor and the generator may be assumed to have a full load rating of 1.5 kilowatts at 230 volts. The armature 1a of the motor is supplied from an adjustable voltage generator 2 which is driven at a speed which is substantially constant by suitable driving means which is illustrated as an induction motor 3 which is supplied from a suitable polyphase source of alternating voltage such as the three supply lines 4. The armature 1a of the motor and the armature 2a of the generator are connected in a series loop circuit in which no contact making and breaking devices are included. Excitation is furnished to the separately excited field winding 1b of the motor from a substantially constant source of voltage which is represented in the drawing by the exciter buses 5 and 6 which are supplied from an exciter dynamoelectric machine 7. The exciter 7 is driven by the induction motor 3.

The generator 2 is preferably a special cross-armature reaction excited, direct armature reaction compensated dynamoelectric machine, which is known as an amplidyne. It differs from a conventional D.-C. machine in that it has a pair of auxiliary brushes arranged on an axis that is displaced substantially 90 electrical degrees from the axis of the main load brushes 2b. These auxiliary brushes are substantially short circuited by an external conductor. The amplidyne 2 is provided with two separately excited main reference field windings 2c and 2d, an opposing control field winding 2e and a compensating winding 2f.

For the purpose of controlling the speed and direction of rotation of the motor, a reversing type master switch 8 is provided. It comprises movable forward and reverse segments 8a, 8b, 8c and 8d and cooperating stationary fingers 8e, 8f, 8g, 8h, 8i and 8j.

An accelerating resistor 9 is connected in circuit with one or the other of the reference field windings 2c and 2d in reference to operation of the master switch to either its first forward or first reverse position. Thus the master switch directly controls the strength of magnetization and the selective energization of the main reference field windings, thereby to control the magnitude and polarity of the generator voltage.

A range adjusting resistor 10 is connected in circuit with the self-excited opposing control field winding 2e. Preferably resistor 10 has a resistance of approximately 5000 ohms. An operator's foot switch 11 is connected in circuit with the main reference field winding, and it serves when operated to deenergize the active reference field winding and to initiate rapid decay of the generator flux by the opposing flux of the self-excited control field winding 2e and thereby to initiate regenerative braking of the motor.

When the resistor 10 is adjusted to provide the maximum required output voltage of the generator, the magnetomotive force of the self-excited opposing field winding 2e is not strong enough to neutralize the residual magnetism of the generator. The residual voltage of small generators, e. g. 1.5 kilowatts, is approximately 3 or 4 volts which is sufficient to cause creepage of the motor in installations in which the driven machine is equipped with anti-friction bearings. Creepage of the motor is intolerable in applications such as tire building machines and other industrial machines in which certain operations must be performed with the machine at rest in the position in which it is brought to rest.

For the purpose of enabling the self-excited opposing field winding to neutralize the residual magnetism of the generator when the main reference field winding is deenergized and thus to eliminate creepage of the motor, a circuit is connected in series with the self-excited field winding which contains a resistor which has relatively low resistance at low voltages of generator and relatively high resistance at high voltages of the generator. In the normal operating range of the generator voltages, the resistance of the parallel resistor should be at least several times as great at rated full generator voltage as it is at zero generator voltage. This change should occur in less than the time required to accelerate the motor from standstill to full speed at rated full load. For small industrial motors of the order of 2 horsepower or less, the accelerating time may be as short as .5 second.

One form of resistor which meets the foregoing requirements is an incandescent lamp having a tungsten filament. The filament temperature of a 40 watt tungsten lamp when operated at rated voltage i. e. 120 volts is between 2680 and 3250 deg. K and the resistance is approximately 360 ohms. When operated at the residual voltage of the generator i. e. 3 or 4 volts the filament temperature will be slightly above room temperature and its resistance, which under this condition is referred to as its cold resistance, will be approximately 25–30 ohms.

Accordingly in view of the ideal characteristics of lamps with tungsten filaments, a plurality of such lamps 12 and 13 are connected in series relationship with each other in a branch circuit which is connected in parallel with the adjusting resistor 10. Since the resistance of the lamps even at incandescence is small in comparison with that of the resistor 10 in the parallel circuit, resistor 10 has little effect on the total resistance in series with the self-excited field winding which consequently is determined predominantly by the resistance of the lamps. With the foregoing understanding of the elements and their organization in the system the operation of the system will readily be understood from the following detailed description.

The motor is started in the forward direction by moving the master switch to its first forward position and then closing the foot switch 11 to complete an energizing circuit for the main reference field winding 2c with the full amount of the accelerating resistor in series. Consequently, the reference field winding 2c is energized and the voltage of the generator begins to rise and to effect acceleration of the motor. As the generator voltage rises the opposing control field winding is energized and its magnetomotive force begins to build up and to oppose the magnetomotive force of the main reference field winding. The build-up of the opposing magnetomotive force progressively reduces the rate of rise of the generator voltage.

Movement of the master switch to its second forward position short circuits the accelerating resistor 9 to apply full voltage to the reference field winding 2c. As a result, the generator voltage rises toward the maximum value and thus in turn effects further acceleration of the motor. The magnetomotive force of the self-excited field winding 2e continues to rise and oppose the magnetomotive force of the main reference field winding and thus to continue progressively to reduce the rate of rise of generator voltage and the rate of acceleration of the motor.

At the beginning of the starting period the combined resistance of resistor 10 and the lamps 12 and 13 is less than that of the lamps alone. Since the lamps are cold at the start, their resistance is sufficiently low to permit the excitation of the control field winding to rise and effectively oppose the magnetomotive force of the main reference field winding. However, as the voltage of the generator increases the lamp filaments become heated to incandescence and their resistance increases to a value at least several times greater than their cold resistance thereby preventing the magnetomotive force of the opposing control field winding 2e from building up to a value which would prevent the net excitation of the generator, the generated voltage and the speed of the motor from attaining their required operating values. This operation continues until a balanced condition is reached in which the ampere turns of the opposing control field are approximately 90 percent of the amperes of the reference winding with the difference providing the net excitation of the generator along its control axis.

To stop the motor, the operator releases the foot switch 11 thereby to interrupt the energizing circuit of the reference field winding. This causes the net excitation flux of the generator to decrease which in turn causes the generator voltage to decrease. The speed with which the generator flux is decreased is augmented by the magnetomotive force of the opposing control field winding 2e. The decrease of the generator voltage is quite rapid.

As the generator voltage decreases the motor 1 operates as a generator and pumps back into the generator 1 and thus produces a vigorous regenerative braking force which rapidly brings the motor and the driven machine to a very low speed.

The decreasing voltage of the generator causes the lamps 12 and 13 to cool rapidly with the result that their total resistance decreases from approximately seven hundred ohms at full voltage of the generator to approximately sixty ohms when the generator voltage reaches the low value of 3 or 4 volts resulting from its residual magnetism. As a result of this substantial decrease in the resistance in series with the self-excited field winding, the current flowing in the circuit of the field winding will increase sufficiently to substantially neutralize the residual magnetism of the generator and thus to permit the motor 1 to be regeneratively braked to rest and maintained at standstill until the main reference field winding is reenergized.

Although in accordance with the Patent Statute the principle of this invention has been described together with the best mode in which it is now contemplated applying that principle, it will be understood that the invention is not limited thereto since alterations and modifications will occur to persons skilled in the art without departing from the true spirit of the invention or the scope of the annexed claims.

What I claim as new and desire to secure by Letters Patent of the United States is:

1. A control system comprising a direct current dynamo-electric machine having a separately excited reference field winding and an opposing self-excited field winding, a switching device for interrupting the circuit of said reference field winding, and means for causing said opposing field winding to neutralize the residual magnetism of said machine following interruption of of said separately excited field winding circuit comprising a resistance device connected in circuit, with said self-excited field winding that has a resistance at rated voltage under steady state operating conditions that is several times larger than its cold resistance.

2. A control system comprising in combination a dynamo-electric machine having a main separately excited reference field winding, a switching device for interrupting the circuit of said field winding to decrease the magnetization of said machine, a self-excited field winding connected across the armature terminals of said machine and having a polarity opposite to the polarity of said reference field, and means for enabling said self-excited field winding substantially to neutralize the residual magnetism of said machine comprising a resistor connected in circuit with said self-excited field winding and having a resistance when operating at rated voltage several times its cold resistance.

3. A control system comprising a direct current dynamo-electric machine having a main separately excited reference field winding on an opposing self-excited control field winding, a switching device for interrupting the circuit of said reference field winding to decrease the magnetization of said machine, an adjustable resistor having a cold resistance substantially equal to its resistance when operating at rated voltage connected in series relationship with said control field winding, and means for enabling said control field winding to neutralize the residual magnetism of said machine following interruption of the circuit of said main field winding, comprising a resistor connected in parallel with said adjustable resistor and having a resistance when operating at rated voltage several times its cold resistance.

4. A control system comprising a direct current dynamo-electric machine having a main separately excited reference field winding and an opposing self-excited control field winding, a switching device for interrupting the circuit of said reference field winding to decrease the magnetization of said machine, and means for enabling said self-excited field winding substantially to neutralize the residual magnetism of said machine following interruption of the circuit of said reference field winding comprising an incandescent lamp connected in series relationship with said self-excited field winding and having a filament resistance at incandescence several times its cold filament resistance.

LAVERNE E. BUESS.

References Cited in the file of this patent

UNITED STATES PATENTS

| Number | Name | Date |
| --- | --- | --- |
| 1,932,073 | James | Oct. 24, 1933 |
| 2,537,794 | Shaad et al. | Jan. 9, 1951 |